(12) United States Patent
Tremaine

(10) Patent No.: US 8,106,313 B2
(45) Date of Patent: Jan. 31, 2012

(54) WIRE FITTING

(75) Inventor: John M Tremaine, New Canaan, CT (US)

(73) Assignee: Qtran, Inc., Milford, CT (US)

( * ) Notice: Subject to any disclaimer, the term of this patent is extended or adjusted under 35 U.S.C. 154(b) by 362 days.

(21) Appl. No.: 12/470,667

(22) Filed: May 22, 2009

(65) Prior Publication Data

US 2009/0288877 A1 Nov. 26, 2009

Related U.S. Application Data

(60) Provisional application No. 61/128,716, filed on May 22, 2008.

(51) Int. Cl.
*H02G 3/18* (2006.01)

(52) U.S. Cl. ........ 174/653; 174/650; 174/655; 174/652; 277/607; 277/622; 285/322

(58) Field of Classification Search .................. 174/650, 174/653, 655, 652, 657, 660, 68.1, 68.3, 174/135; 285/207, 208, 210, 151.1, 149.1, 285/154.1, 322, 323; 277/607, 608, 622, 277/623, 644, 647; 439/271–277, 281
See application file for complete search history.

(56) References Cited

U.S. PATENT DOCUMENTS

| | | | | | |
|---|---|---|---|---|---|
| 4,145,075 | A | * | 3/1979 | Holzmann | 285/322 |
| 4,250,348 | A | * | 2/1981 | Kitagawa | 174/655 |
| 5,410,104 | A | * | 4/1995 | Gretz et al. | 174/653 |
| 5,600,094 | A | * | 2/1997 | McCabe | 174/653 |
| 5,773,759 | A | * | 6/1998 | Hablutzel | 174/653 |
| 5,920,035 | A | * | 7/1999 | Haney et al. | 174/652 |
| 5,927,892 | A | * | 7/1999 | Teh-Tsung | 285/322 |
| 6,268,565 | B1 | * | 7/2001 | Daoud | 174/657 |
| 7,431,343 | B2 | * | 10/2008 | Chiu | 174/655 |
| 7,504,582 | B1 | * | 3/2009 | Chiu | 174/650 |
| 7,595,455 | B2 | * | 9/2009 | Robinson | 174/655 |

* cited by examiner

*Primary Examiner* — Angel R Estrada
(74) *Attorney, Agent, or Firm* — Ware, Fressola, Van Der Sluys & Adolphson LLP

(57) ABSTRACT

The present invention is directed to a wire fitting that may be used to pass a wire, cable or other conductor through a surface in order to produce a substantially secure and water tight connection between the wire fitting, the wire and the surface. The wire fitting may include a cap unit that is configured to be removably affixed to a base unit. The cap unit and the base unit may include corresponding threads to allow the cap unit to be screwed onto the base unit. A compressible plug may be placed between the cap unit and base unit in an opening at an end of the base unit. A washer with a set of ridges may also be placed between the cap unit and the base unit on the compressible plug to facilitate compression of the compressible plug and secure the cap unit into place.

18 Claims, 8 Drawing Sheets

WIRE FITTING

CROSS-REFERENCE TO RELATED APPLICATIONS

This application claims priority to U.S. Provisional Appl. No. 61/128,716 filed May 22, 2008, which is hereby incorporated by reference in its entirety.

BACKGROUND OF THE INVENTION (1) Technical Field

The present invention is related to wire fittings, and more particularly wire fittings that can be used to provide strain relief and produce substantially fluid tight seals.

(2) Background of the Invention

In general, when a conductor such as a wire or cable is passed through a surface and opening in the surface must be made. The opening can be a point of entry of water, dirt or other undesirable items through the surface. Furthermore, the opening can potentially provide a point of contact to the wire or cable that may result in chaffing or other damage to the wire or cable. Accordingly, what is needed is a fitting that is capable of securing fitting a wire or cable to an opening in a surface to produce a substantially sealed connection and reduce potential damage to the wire or cable.

SUMMARY OF THE INVENTION

The present invention is directed to a wire fitting that may be used to pass a wire, cable or other conductor through a surface in order to produce a substantially secure and water tight connection between the wire fitting, the wire and the surface. The wire fitting may also be used to act as a strain relief fitting for the wire. The wire fitting may include a cap unit that is configured to be removably affixed to a base unit, for example by being screwed onto the base unit. The cap unit and the base unit may include corresponding threads to allow the cap unit to be screwed onto the base unit. A compressible plug may be placed between the cap unit and base unit in an opening at an end of the base unit. The compressible plug is configured to seal both to the inside of the base unit and to a wire that may be placed through a bore in the compressible plug as the cap unit is affixed onto the base unit. A washer with a set of ridges may also be placed between the cap unit and the base unit on the compressible plug to facilitate compression of the compressible plug and secure the cap unit into place.

The base unit may have tapered threads configured to engage tapered threads formed in a surface to produce at least a substantially water tight connection. The tapered threads may be national pipe taper (NPT) or similar locking type threading. The base unit may have a nut with a washer molded to the base unit in order to provide a substantially flat surface to engage a first side of a surface. A compressible washer may be placed in between the first side of the surface and the nut with the washer of the base unit. A nut washer may be secured to a threaded section of the base unit that has been placed through an opening of the surface, and another compressible washer may be used in between the nut washer and a second side of the surface. One compressible washer acts to at least substantially seal the first side of the surface to the base unit, and the other compressible washer acts to at least substantially seal the second side of the housing to the nut washer. The threaded section on the base unit may be machine screw thread (MST) or similar threading.

According to a first aspect of the invention a tubular body is provided, and the tubular body may include a first end and a second end, a first opening at the first end, a second opening at the second end, a passage between the first opening and the second opening defining an interior region of the tubular body, and first threads positioned on an exterior surface of the tubular body. The first opening may be dimensioned for receipt of a compressible plug that includes at least one bore. The first threads may be configured to threadenly engage a cap unit so that as the cap unit is threaded onto the first threads the cap unit is configured to urge the compressible plug towards the second end of the tubular body. A first diameter of the passage at a first position may be larger than a second diameter of the passage at a second position to provide a tapered section of the passage between the first position and the second position, and the tapered section of the passage may be configured to compress at least a portion of the compressible plug so that a cross-sectional area of the at least one bore is decreased as the cap unit is threaded onto the first threads of the tubular body.

In accordance with the first aspect of the invention, the tubular body may also include a polygonal structure positioned concentrically with the tubular body, and formed integrally with the exterior surface of the tubular body.

In accordance with the first aspect of the invention, the tubular body may also include second threads positioned on the exterior surface of the tubular body and separated from the first threads by the polygonal structure.

In accordance with the first aspect of the invention, the tubular body may also include a lip extending from the passage positioned between the second end and the tapered section and having a diameter smaller than the second diameter of the passage.

In accordance with the first aspect of the invention, the tapered section of the passage may define a frustum.

In accordance with the first aspect of the invention, the compressible plug may be substantially cylindrical and comprises a first side and a second side opposite the first side, and the at least one bore runs from the first side to the second side of the compressible plug.

In accordance with the first aspect of the invention, the compressible plug may include at least one slot positioned on the first side and dimensioned for receipt of a protrusion of a ring washer, wherein the ring washer may have an outer diameter substantially equal to a diameter of the compressible plug and the ring washer may have an inner diameter smaller than the outer diameter.

In accordance with the first aspect of the invention, the ring washer may be dimensioned to be positioned between the cap unit and the compressible plug when the cap unit is threaded onto the first threads of the tubular body.

In accordance with the first aspect of the invention, the ring washer may include a set of ridges opposite the protrusion, and the set of ridges may be dimensioned to engage a set of ridges on an interior surface of the cap unit so as to produce an audible noise as the cap unit is threaded onto the first threads of the tubular body.

In accordance with the first aspect of the invention, the cap unit may include a hollow cylindrical body and a first face positioned at a first end of the hollow cylindrical body, the hollow cylindrical body may include threads on an interior region of the hollow cylindrical body, and the first face may include an opening positioned so as to be substantially aligned with the at least one bore of the compressible plug and the passage of the tubular body when the cap unit is threaded onto the first threads of the tubular body.

In accordance with the first aspect of the invention, the tubular body may further include a substantially circular flange positioned concentrically with the tubular body and formed integrally with the tubular body adjacent to the polygonal structure.

In accordance with the first aspect of the invention, the polygonal structure may include a regular polygon.

In accordance with the first aspect of the invention, the polygonal structure may include a nut.

In accordance with the first aspect of the invention, the second threads may be machine screw threads.

In accordance with the first aspect of the invention, the second threads may be national pipe taper threads.

In accordance with the first aspect of the invention, the second threads may have a first pitch diameter adjacent to the polygonal structure that is greater than a second pitch diameter adjacent to the second end.

In accordance with the first aspect of the invention, the second threads may have a pitch diameter that is less than a pitch diameter of the first threads.

In accordance with the first aspect of the invention, the second threads may be configured to threadenly engage a nut washer.

In accordance with the first aspect of the invention, the cap unit may include a pair of protrusions positioned on the first face.

According to a second aspect of the invention a wire fitting is provided that may include a tubular body including a first end and a second end, a first opening at the first end, a second opening at the second end, a passage between the first opening and the second opening defining an interior region of the tubular body, and first threads positioned on an exterior surface of the tubular body. The wire fitting may also include a compressible plug dimensioned for insertion into the first opening of the tubular body, and including a first side and a second side opposite the first side, and at least one bore runs from the first side to the second side of the compressible plug. The wire fitting may also include a cap unit comprising a hollow cylindrical body and a first face positioned at a first end of the hollow cylindrical body, the hollow cylindrical body may include threads on an interior region of the hollow cylindrical body configured to threadenly engage the first threads so that as the cap unit is threaded onto the first threads the cap unit urges the compressible plug towards the second end of the tubular body, and the first face may include an opening positioned so as to be substantially aligned with the at least one bore of the compressible plug and the passage of the tubular body when the cap unit is threaded onto the first threads of the tubular body. A first diameter of the passage at a first position may be larger than a second diameter of the passage at a second position to provide a tapered section of the passage between the first position and the second position, and the tapered section of the passage may be configured to compress at least a portion of the compressible plug so that a cross-sectional area of the at least one bore is decreased as the cap unit is threaded onto the first threads of the tubular body.

BRIEF DESCRIPTION OF THE DRAWINGS

Figure 1A:
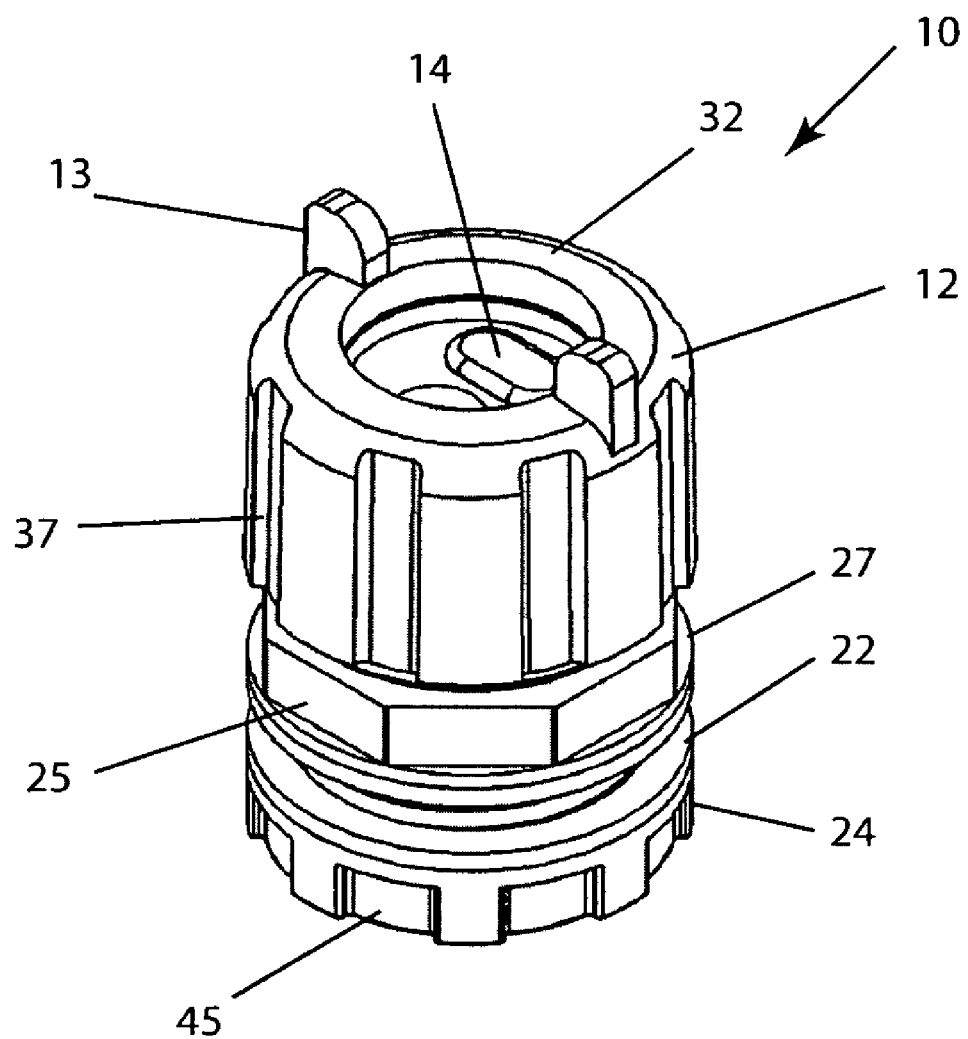
Figure 1B:
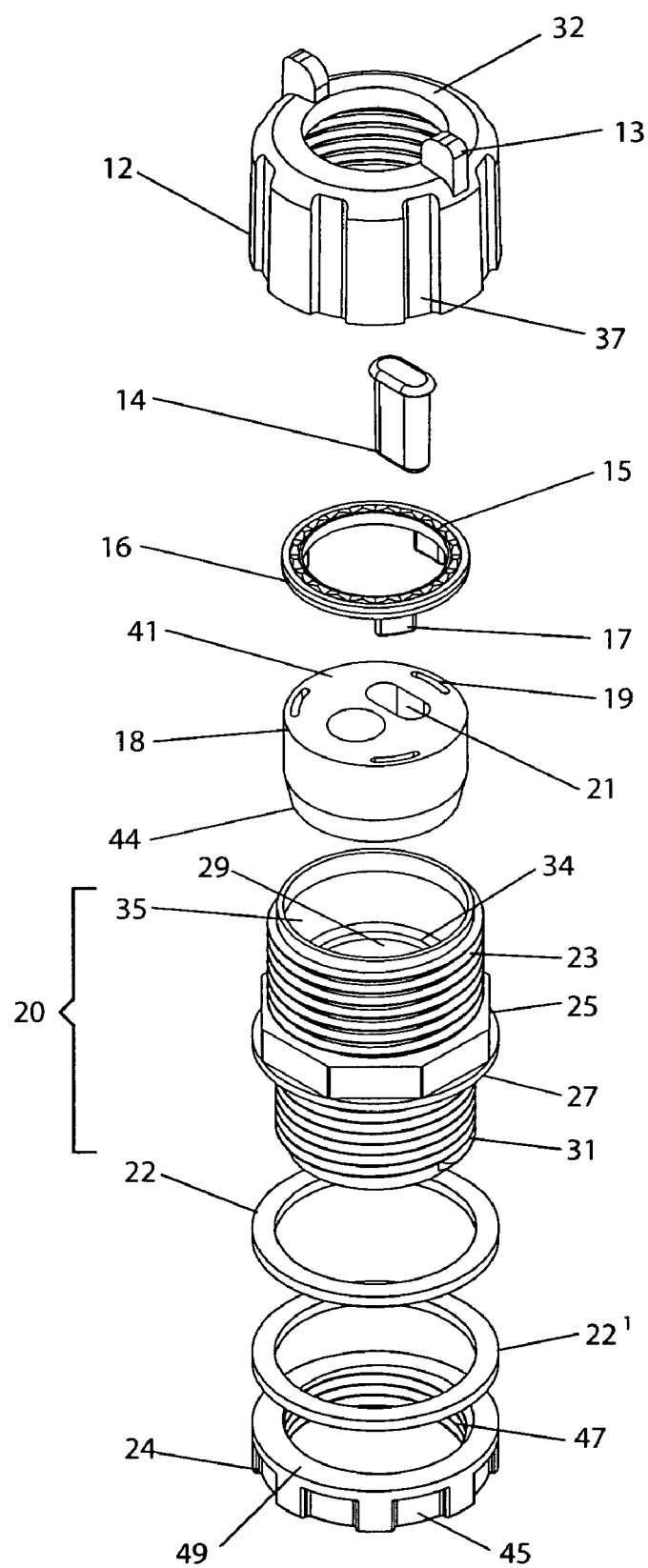
Figure 1C:
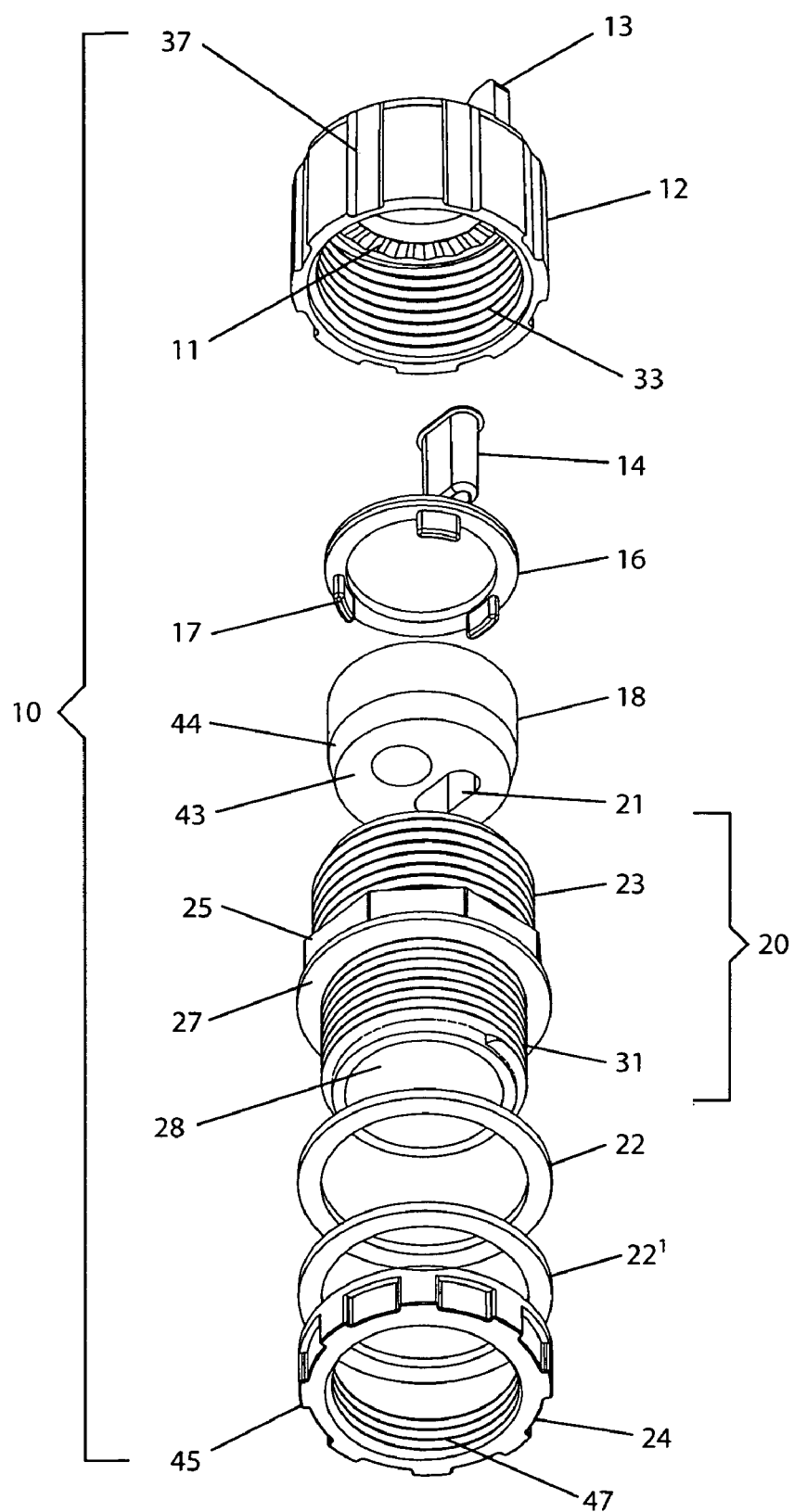
Figure 2A:
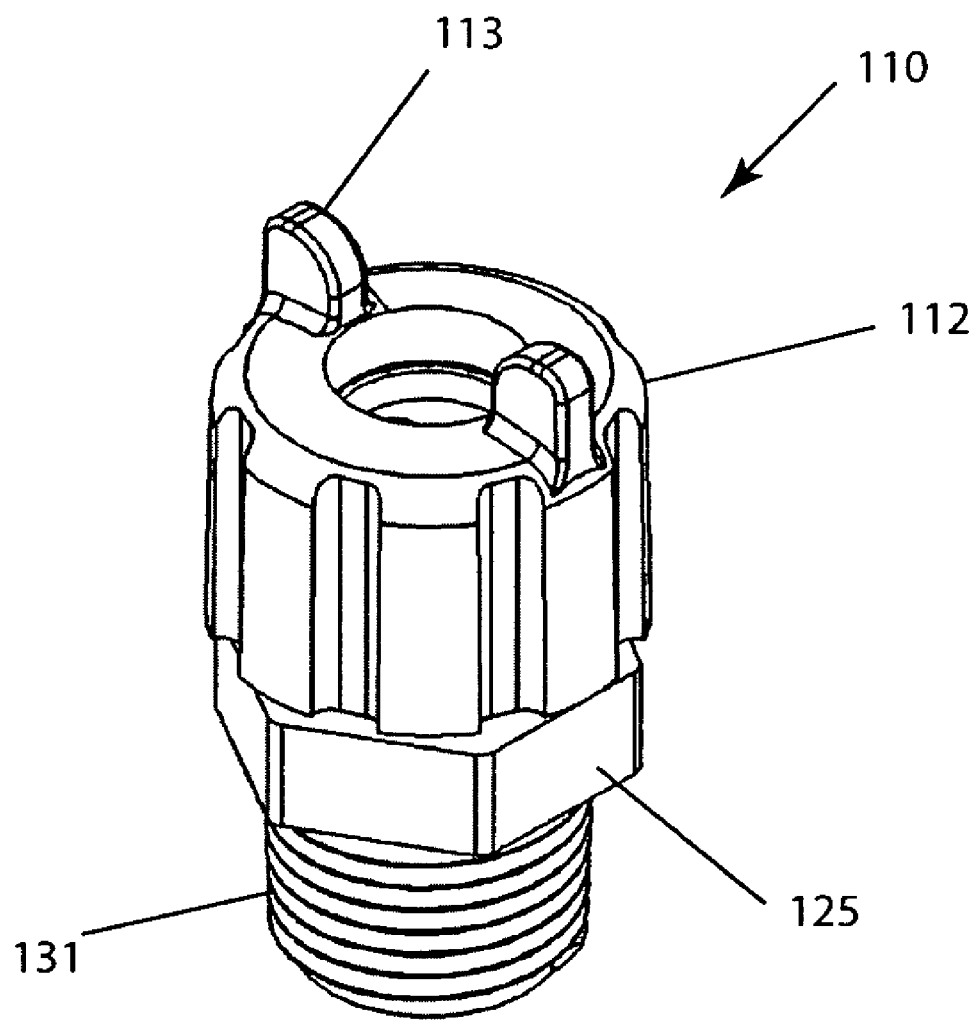
Figure 2B:
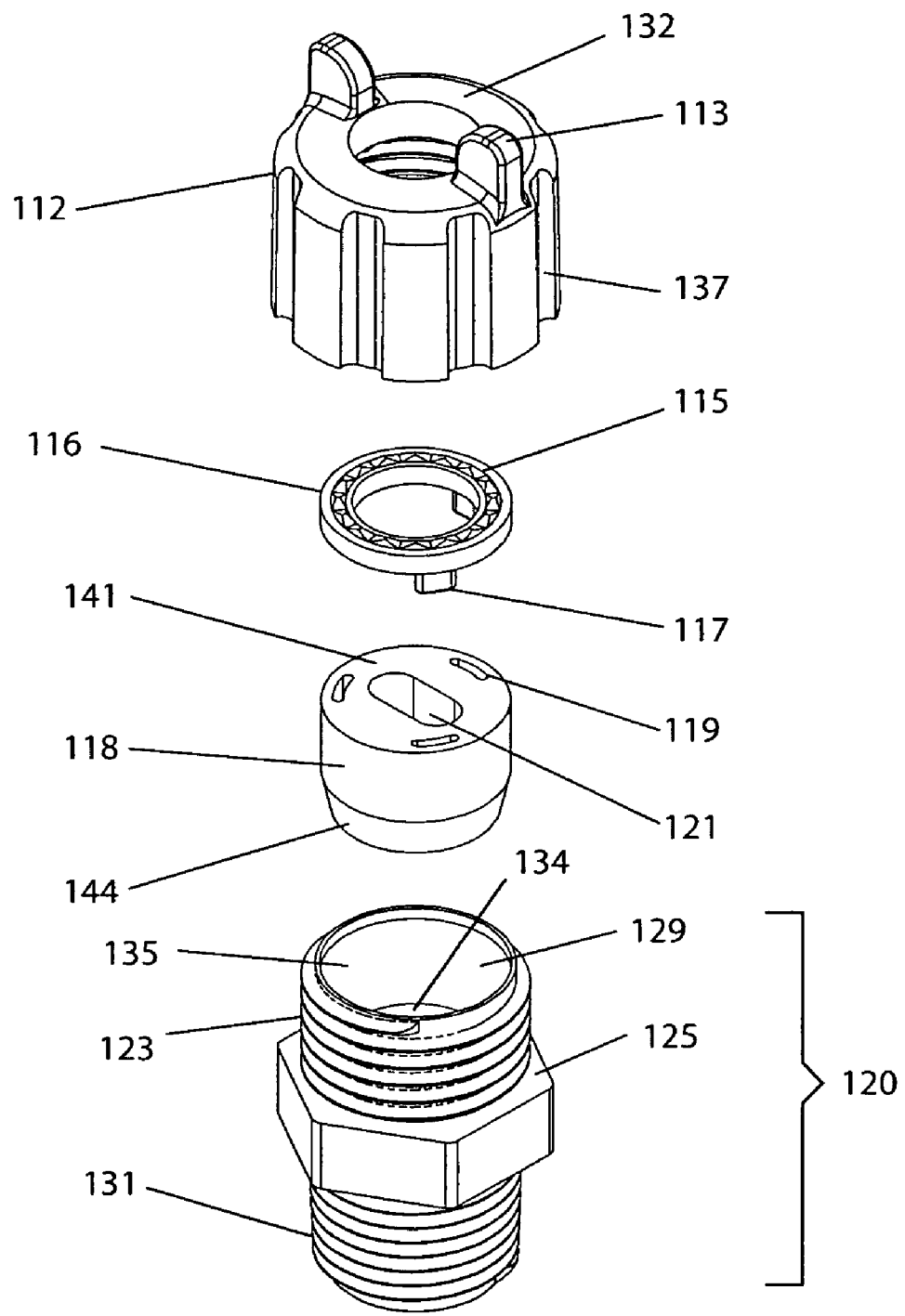
Figure 2C:
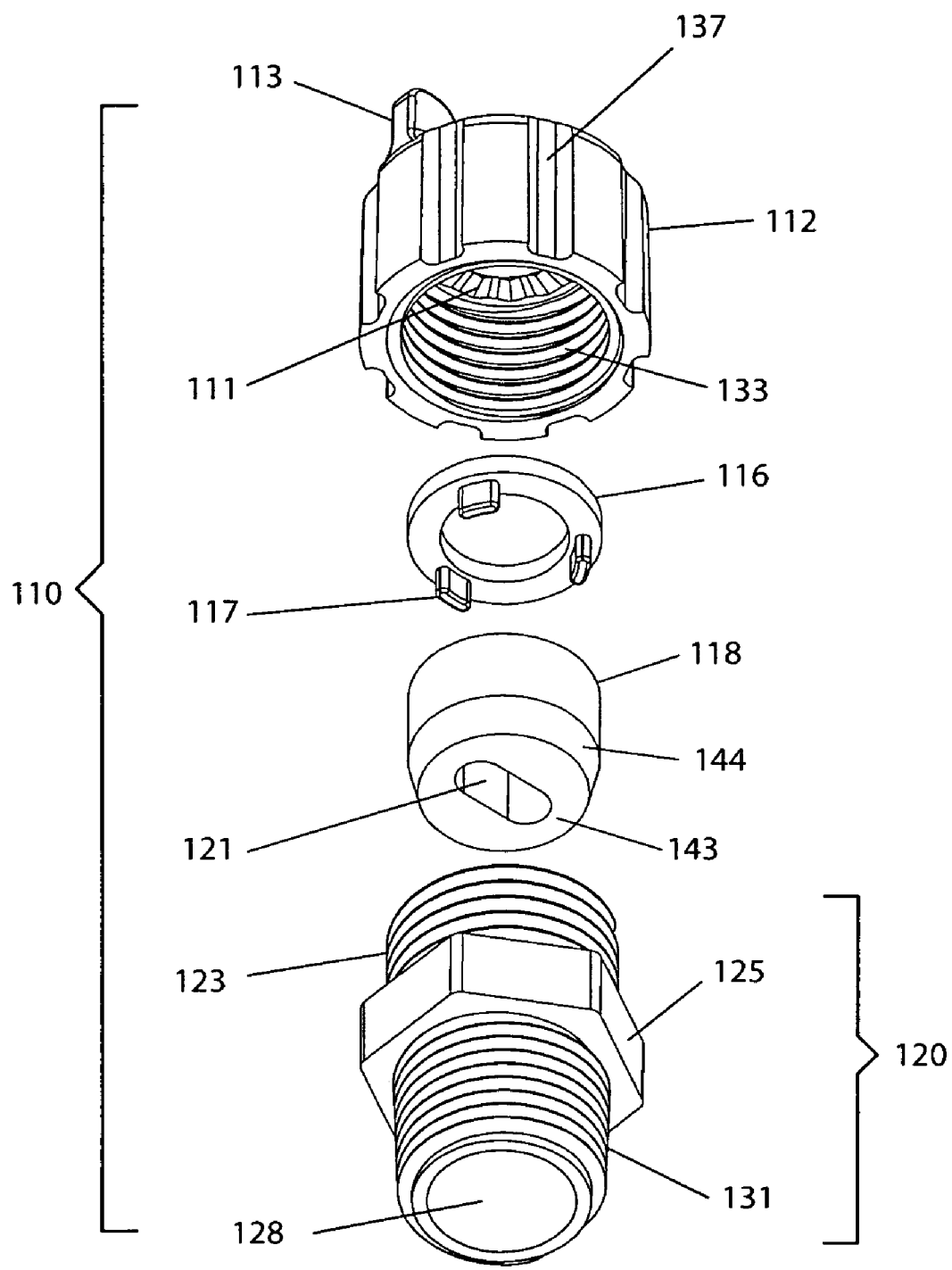
Figure 3A:
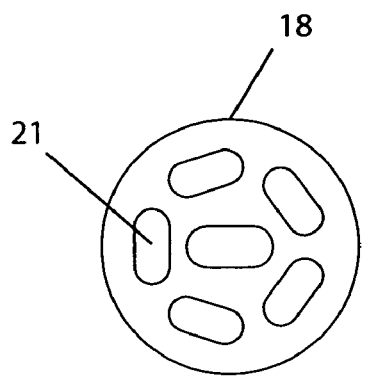
Figure 3B:
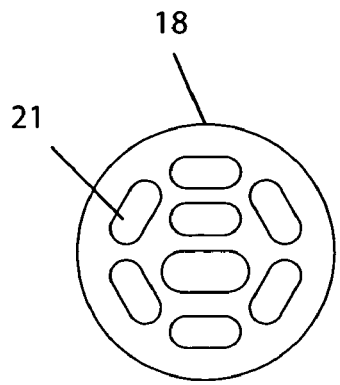
Figure 3C:
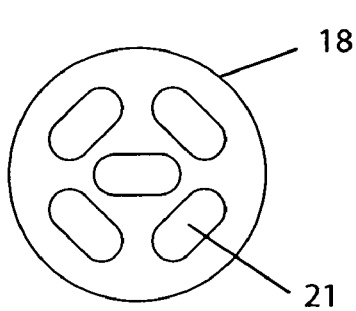
Figure 3D:
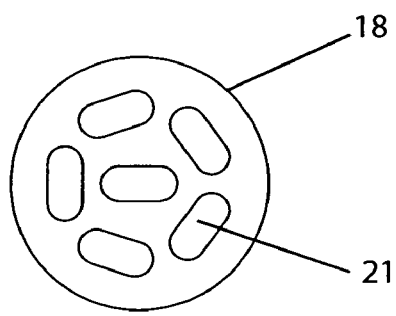
Figure 3E:
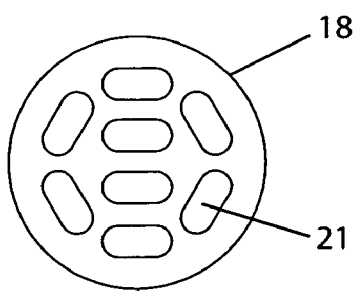
Figure 3F:
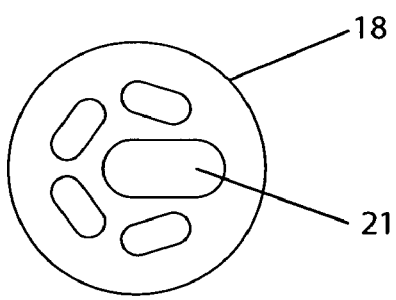
Figure 3G:
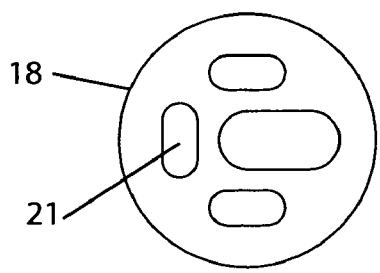
Figure 3H:
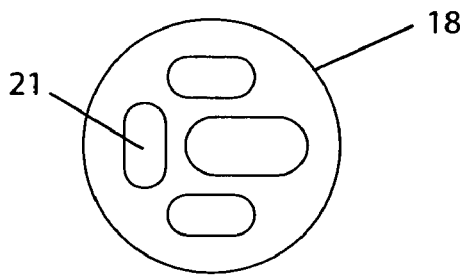
Figure 3I:
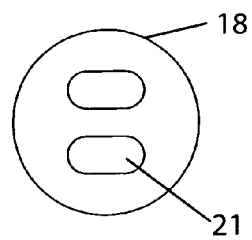
Figure 3J:
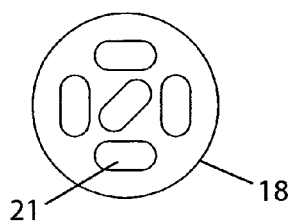
Figure 3K:
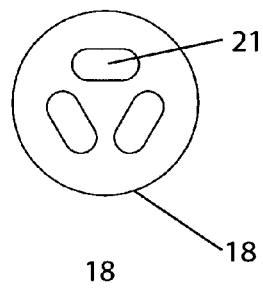
Figure 3L:
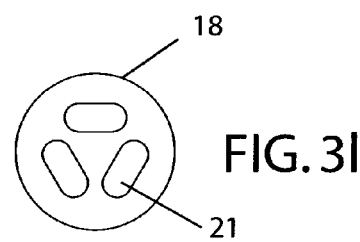
Figure 3N:
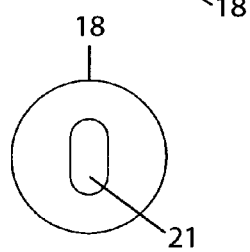
Figure 3M:
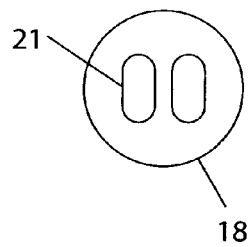
Figure 3O:
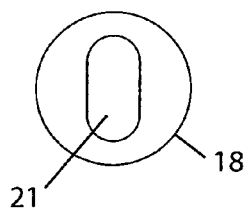
Figure 3P:
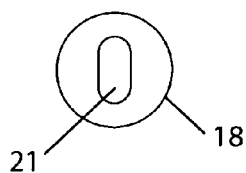

Having thus described the invention in general terms, reference will now be made to the accompanying drawings, which are not necessarily drawn to scale, where:

FIG. 1a is an isometric view of an assembled wire fitting according to an aspect of the present invention, FIG. 1b is an exploded view of the wire fitting of FIG. 1a as viewed from above, FIG. 1c is an exploded view of the wire fitting of FIG. 1a as viewed from below, FIG. 2a is an isometric view of an assembled wire fitting according to an aspect of the present invention, FIG. 2b is an exploded view of the wire fitting of FIG. 2a as viewed from above, FIG. 2c is an exploded view of the wire fitting of FIG. 2a as viewed from below, FIGS. 3a-3p show various configurations and sizes for openings that may be used for a plug of the wire fittings shown in FIG. 1a and FIG. 2a.

DETAILED DESCRIPTION OF THE INVENTION

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout, and may be increased by 100 when referring to different embodiments of the invention.

FIGS. 1a, 1b and 1c show an exemplary embodiment of a wire fitting 10 according to the present invention. The wire fitting 10 may include a cap unit 12 that is configured to be releasably affixed onto a base unit 20. For example, the cap unit 12 may be secured to the base unit 20 by screwing the cap unit 12 onto the base unit 20. The cap unit 12 includes a hollow cylindrical body and a first face 32 positioned at a first end of the hollow cylindrical body. Threads 33 are positioned on an interior region of the hollow cylindrical body of the cap unit 12. The cap unit 12 may further include wing nut protrusions 13 that allow for finger tightening of the cap unit 12 onto the base unit 20. At least one ridge 11 may be positioned on a surface in the interior region of the hollow cylindrical body of the cap unit 12 opposite the first face 32. The cap unit 12 may include one or more grooves 37 on an exterior surface of the hollow cylindrical body that may be used to facilitate turning of the cap unit 12 by hand or a tool. The cap unit 12 may be made from polycarbonate resin thermoplastic, plastic or the like, but it is understood that any suitable material may be used.

Still referring to FIGS. 1a, 1b and 1c, as mentioned above the wire fitting 10 may also include a base unit 20 made of a tubular body with a first end and a second end, a first opening 29 at the first end and a second opening 28 at the second end. A passage is formed in the tubular body between the first opening 29 and the second opening 28, which defines an interior region of the tubular body. The passage of the tubular body may include a tapered section 35 in which the diameter of the passage at a first position is larger than the diameter of the passage at a second position. As shown in FIG. 1b for example, the first position is closer to the first opening 29 than the second position. The passage of the tubular body may also include a lip 34 that has a diameter smaller than the second diameter of the passage. Accordingly, the lip 34 may be positioned adjacent to the tapered section 35 of the passage. The lip 34 may be positioned in the passage between the second opening 28 and the tapered section 35. The tubular body may also include first threads 23 and second threads 31 positioned on an exterior surface of the tubular body of the base unit 20. The first threads 23 and/or the second threads 31 may be machine screw thread (MST) or equivalent. The pitch diameter of the second threads 31 may be equal to or less than the pitch diameter of the first threads 23, but it is understood that the invention is not limited to any particular pitch diameter or relationship of pitch diameter between the first threads 23 and the second threads 31. It is understood that pitch diameter refers to the diameter where the thread thickness is equal to the space between the threads. The base unit 20 may be made from polycarbonate resin thermoplastic, plastic or the like, but it is understood that any suitable material may be used.

A polygonal structure 25 may separate the first threads 23 and the second threads 31, and be positioned concentrically with the tubular body. The polygonal structure 25 may be a regular polygon, for example but not limited to a square, hexagon or octagon, and may include one or more substantially flat faces. The polygonal structure 25 may be in the form of a nut or the exterior region of a nut molded onto the exterior surface of the base unit 20. The polygonal structure 25 may be formed integrally with the exterior surface of the tubular body. A circular flange 27 may be positioned adjacent to the polygonal structure 25 on the base unit 20, and the circular flange 27 may be in the form of a molded washer. The circular flange 27 may be positioned concentrically with the tubular body, and formed integrally with the tubular body of the base unit 20.

The wire fitting 10 may also include a compressible plug 18 that may be substantially cylindrical and includes a first side 41 and a second side 43 opposite the first side 43. The compressible plug 18 may also include a tapered portion 44 that substantially defines a frustum. At least one bore 21 may run from the first side 41 to the second side 43. The at least one bore 21 may be dimensioned for receipt of a wire, conductor or other cable. The at least one bore 21 may be of various configurations and sizes as shown in FIGS. 3a-3p. However, it is understood that the sizes and configurations shown in FIGS. 3a-3p for the openings are merely exemplary, and the invention is not limited to the sizes and configurations shown in FIGS. 3a-3p. A plug 14 may be placed into the at least one bore 21 of the compressible plug 18. Plugs 14 of various shapes and configurations may be used depending upon the corresponding sizes and shapes of the bores, and it is understood that the invention is not limited to particular shapes and configurations of plugs 14. The plug 14 acts to seal non-used bores of the compressible plug 18. The compressible plug 18 may also include one or more slots 19 positioned on the first side 41 of the compressible plug 18. The compressible plug 18 may be made from any suitable compressible material, for example rubber or urethane or the like. The wire fitting 10 may also include a click-ring washer 16 that includes one or more tabs or protrusions 17 that may be dimensioned for insertion into the one or more slots 19 of the compressible plug 18. The click-ring washer 16 may include a set of ridges 15 on an opposite side of the click-ring washer 16 as the one or more tabs or protrusions 17. The click-ring washer 16 may have an outer diameter that is substantially equal to the diameter of the compressible plug 18. The click-ring washer 16 may be made from polycarbonate resin thermoplastic, plastic or the like, but it is understood that any suitable material may be used.

The wire fitting 10 may also include a nut washer 24 that includes at least one substantially flat surface 49, and threads 47 positioned on an interior surface of the nut washer 24. The nut washer 24 may be made from polycarbonate resin thermoplastic, plastic or the like, but it is understood that any suitable material may be used. The nut washer 24 may also include one or more grooves 45 that may be used to facilitate turning of the nut washer 24 by hand or a tool. The wire fitting 10 may also include a first compressible washer 22 and a second compressible washer 22' that are substantially the same size as the substantially flat surface 49 of the nut washer 24. The first compressible washer 22 and the second compressible washer 22' may be made from a compressible material such as rubber, urethane or the equivalent.

The components of the wire fitting 10 shown in FIGS. 1a, 1b and 1c are combined and operate as follows. The compressible plug 18 is substantially the same diameter as the first opening 29 of the base unit 20. Accordingly, the compressible plug 18 is dimensioned to be inserted into the first opening 29 of the base unit 20. The click-ring washer 16 may then be placed on the compressible plug 18 with the tabs or protrusions 17 engaging the slots 19 of the compressible plug 18. The cap unit 12 may then be screwed onto the first threads 23, which are configured to engage the threads 33 of the cap unit 12. As the cap unit 12 is screwed onto the base unit 20 the compressible plug 18 is urged towards the interior region of the base unit 20. As a result, the tapered region 35 acts to compress the compressible plug 18, and thereby reduce the cross-sectional area of the at least one bore 21. When a wire, conductor or other cable (not shown) is inserted through the at least one bore 21, and the cap unit 12 is screwed onto the base unit 20 the compressible plug 18 forms a substantially water-tight seal against the wire, conductor or other cable (not shown) because the cross-sectional area of the at least one bore 21 is reduced to the size of the cross-sectional area of the wire, conductor or other cable (not shown). In this manner, the present embodiment acts to produce a substantially water-tight seal against the wire, conductor or other cable (not shown) and provide a stress-relief fitting for the wire, conductor or other cable (not shown).

Furthermore, the one or more ridges 15 of the click-ring washer 16 are configured to engage the one or more ridges 11 on the interior region of the cap unit 12. The ridges 15 on the click-ring washer 16 cause an audible noise, for example a clicking sound, to be made against the ridges 11 on the cap unit 12 as the cap unit 12 is screwed onto the base unit 20. In addition, the one or more ridges 15 on the click-ring washer 16 engage with the ridges 11 of the cap unit 12 to produce a substantially secure fit so that an amount of force is required to disengage the ridges in order to loosen the cap unit 12 from the base unit 20.

Still referring to FIGS. 1a, 1b and 1c, the second threads 31 of the base unit 20 are configured to engage the threads 47 of the nut washer 24. One of the compressible washers 22 may be positioned between the circular flange 27 and a first side of a surface (not shown), for example the surface of an enclosure. The second threads are thereby passed through an opening in the surface (not shown), and the second compressible washer 22' may be positioned between the nut washer 24 and a second side of the surface (not shown). The compressible washer 22 and the second compressible washer 22' are thereby compressed between the circular flange 27 and the nut washer 24 respectively to create a substantially water-tight seal when the wire fitting 10 is secured through the surface.

FIGS. 2a, 2b and 2c show an exemplary embodiment of a wire fitting 110 according to the present invention. The wire fitting 110 may include a cap unit 112 that is configured to be releasably affixed onto a base unit 120. For example, the cap unit 112 may be secured to the base unit 120 by screwing the cap unit 112 onto the base unit 120. The cap unit 112 includes a hollow cylindrical body and a first face 132 positioned at a first end of the hollow cylindrical body. Threads 133 are positioned on an interior region of the hollow cylindrical body of the cap unit 112. The cap unit 112 may further include wing nut protrusions 113 that allow for finger tightening of the cap unit 12 onto the base unit 120. At least one ridge 111 may be positioned on a surface in the interior region of the hollow cylindrical body of the cap unit 112 opposite the first face 132. The cap unit 112 may include one or more grooves 137 on an exterior surface of the hollow cylindrical body that may be used to facilitate turning of the cap unit 112 by hand or a tool. The cap unit 112 may be made from polycarbonate resin thermoplastic, plastic or the like, but it is understood that any suitable material may be used.

Still referring to FIGS. 2a, 2b and 2c, as mentioned above the wire fitting 110 may also include a base unit 120 made of a tubular body with a first end and a second end, a first opening 129 at the first end and a second opening 128 at the second end. A passage is formed in the tubular body between the first opening 129 and the second opening 128, which defines an interior region of the tubular body. The passage of the tubular body may include a tapered section 135 in which the diameter of the passage at a first position is larger than the diameter of the passage at a second position. As shown in FIG. 2b for example, the first position is closer to the first opening 129 than the second position. The passage of the tubular body may also include a lip 134 that has a diameter smaller than the second diameter of the passage. Accordingly, the lip 134 may be positioned adjacent to the tapered section 135 of the passage. The lip 134 may be positioned in the passage between the second opening 128 and the tapered section 135. The tubular body may also include first threads 123 and second threads 131 positioned on an exterior surface of the tubular body of the base unit 120. The first threads 123 may be machine screw thread (MST) or equivalent. The second threads 131 may be national pipe taper (NPT) threads or equivalent. The pitch diameter of the second threads 131 may be equal to or less than the pitch diameter of the first threads 123, but it is understood that the invention is not limited to any particular pitch diameter or relationship of pitch diameters between the first threads 123 and the second threads 131. It is understood that pitch diameter refers to the diameter where the thread thickness is equal to the space between the threads. The second threads 131 may also have a first pitch diameter and a second pitch diameter at a second end of the tubular body that is different from the first pitch diameter. The base unit 120 may be made from polycarbonate resin thermoplastic, plastic or the like, but it is understood that any suitable material may be used.

A polygonal structure 125 may separate the first threads 123 and the second threads 131, and be positioned concentrically with the tubular body. The polygonal structure 125 may be a regular polygon, for example but not limited to a square, hexagon or octagon, and may include one or more substantially flat faces. The polygonal structure 125 may be in the form of a nut or the exterior region of a nut molded onto the exterior surface of the base unit 120. The polygonal structure 125 may be formed integrally with the exterior surface of the tubular body. A circular flange 127 may be positioned adjacent to the polygonal structure 125 on the base unit 120, and the circular flange 127 may be in the form of a molded washer. The circular flange 127 may be positioned concentrically with the tubular body, and formed integrally with the tubular body of the base unit 120.

The wire fitting 110 may also include a compressible plug 118 that may be substantially cylindrical and includes a first side 141 and a second side 143 opposite the first side 143. The compressible plug 118 may also include a tapered portion 144 that substantially defines a frustum. At least one bore 121 may run from the first side 141 to the second side 143. The at least one bore 121 may be dimensioned for receipt of a wire, conductor or other cable. The at least one bore 121 may be of various configurations and sizes as shown in FIGS. 3a-3p. However, it is understood that the sizes and configurations shown in FIGS. 3a-3p for the openings are merely exemplary, and the invention is not limited to the sizes and configurations shown in FIGS. 3a-3p. The compressible plug 118 may be made from any suitable compressible material, for example rubber or urethane or the like. The wire fitting 110 may also include a click-ring washer 116 that includes one or more tabs or protrusions 117 that may be dimensioned for insertion into the one or more slots 119 of the compressible plug 118. The click-ring washer 116 may include a set of ridges 115 on an opposite side of the click-ring washer 116 as the one or more tabs or protrusions 117. The click-ring washer 116 may have an outer diameter that is substantially equal to the diameter of the compressible plug 118. The click-ring washer 116 may be made from polycarbonate resin thermoplastic, plastic or the like, but it is understood that any suitable material may be used.

The components of the wire fitting 110 shown in FIGS. 2a, 2b and 2c are combined and operate as follows. The compressible plug 118 is substantially the same diameter as the first opening 129 of the base unit 120. Accordingly, the compressible plug 118 is dimensioned to be inserted into the first opening 129 of the base unit 120. The click-ring washer 116 may then be placed on the compressible plug 118 with the tabs or protrusions 117 engaging the slots 119 of the compressible plug 118. The cap unit 112 may then be screwed onto the first threads 123, which are configured to engage the threads 133 of the cap unit 112. As the cap unit 112 is screwed onto the base unit 120 the compressible plug 118 is urged towards the interior region of the base unit 120. As a result, the tapered region 135 acts to compress the compressible plug 118, and thereby reduce the cross-sectional area of the at least one bore 121. When a wire, conductor or other cable (not shown) is inserted through the at least one bore 121, and the cap unit 112 is screwed onto the base unit 120 the compressible plug 118 forms a tight substantially water-tight seal against the wire, conductor or other cable (not shown) because the cross-sectional area of the at least one bore 121 is reduced to the size of the cross-sectional area of the wire, conductor or other cable (not shown). In this manner, the present embodiment acts to produce a substantially water-tight seal against the wire, conductor or other cable (not shown) and provide a stress-relief fitting for the wire, conductor or other cable (not shown).

Furthermore, the one or more ridges 115 of the click-ring washer 116 are configured to engage the one or more ridges 111 on the interior region of the cap unit 112. The ridges 115 on the click-ring washer 116 cause an audible noise, for example a clicking sound, to be made against the ridges 111 on the cap unit 112 as the cap unit 112 is screwed onto the base unit 120. In addition, the one or more ridges 115 on the click-ring washer 116 engage with the ridges 111 of the cap unit 112 to produce a substantially secure fit so that an amount of force is required to disengage the ridges in order to loosen the cap unit 112 from the base unit 120.

It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A tubular body, comprising:
   a first end and a second end;
   a first opening at the first end;
   a second opening at the second end;
   a passage between the first opening and the second opening defining an interior region of the tubular body; and first threads positioned on an exterior surface of the tubular body;

wherein the first opening is dimensioned for receipt of a compressible plug comprising at least one bore;

wherein the first threads are configured to threadenly engage a cap unit so that as the cap unit is threaded onto the first threads the cap unit is configured to urge the compressible plug towards the second end of the tubular body;

wherein a first diameter of the passage at a first position is larger than a second diameter of the passage at a second position to provide a tapered section of the passage between the first position and the second position;

wherein the tapered section of the passage is configured to compress at least a portion of the compressible plug so that a cross-sectional area of the at least one bore is decreased as the cap unit is threaded onto the first threads of the tubular body;

wherein the compressible plug is substantially cylindrical and comprises a first side and a second side opposite the first side, wherein the at least one bore runs from the first side to the second side of the compressible plug; and wherein the compressible plug comprises at least one slot positioned on the first side and dimensioned for receipt of a protrusion of a ring washer, wherein the ring washer has an outer diameter substantially equal to a diameter of the compressible plug and the ring washer has an inner diameter smaller than the outer diameter.

2. The tubular body of claim 1, further comprising a polygonal structure positioned concentrically with the tubular body, and formed integrally with the exterior surface of the tubular body.

3. The tubular body of claim 2, further comprising second threads positioned on the exterior surface of the tubular body and separated from the first threads by the polygonal structure.

4. The tubular body of claim 1, further comprising a lip extending from the passage positioned between the second end and the tapered section and having a diameter smaller than the second diameter of the passage.

5. The tubular body of claim 1, wherein the tapered section of the passage defines a frustum.

6. The tubular body of claim 1, wherein the ring washer is dimensioned to be positioned between the cap unit and the compressible plug when the cap unit is threaded onto the first threads of the tubular body.

7. The tubular body of claim 1, wherein the ring washer comprises a set of ridges opposite the protrusion, wherein the set of ridges are dimensioned to engage a set of ridges on an interior surface of the cap unit so as to produce an audible noise as the cap unit is threaded onto the first threads of the tubular body.

8. The tubular body of claim 1, wherein the cap unit comprises a hollow cylindrical body and a first face positioned at a first end of the hollow cylindrical body, wherein the hollow cylindrical body comprises threads on an interior region of the hollow cylindrical body, and the first face comprises an opening positioned so as to be substantially aligned with the at least one bore of the compressible plug and the passage of the tubular body when the cap unit is threaded onto the first threads of the tubular body.

9. The tubular body of claim 2, wherein the tubular body further comprises a substantially circular flange positioned concentrically with the tubular body and formed integrally with the tubular body adjacent to the polygonal structure.

10. The tubular body of claim 2, wherein the polygonal structure comprises a regular polygon.

11. The tubular body of claim 2, wherein the polygonal structure comprises a nut.

12. The tubular body of claim 3, wherein the second threads are machine screw threads.

13. The tubular body of claim 3, wherein the second threads are national pipe taper threads.

14. The tubular body of claim 3, wherein the second threads have a first pitch diameter adjacent to the polygonal structure that is greater than a second pitch diameter adjacent to the second end.

15. The tubular body of claim 3, wherein the second threads have a pitch diameter that is less than a pitch diameter of the first threads.

16. The tubular body of claim 3, wherein the second threads are configured to threadenly engage a nut washer.

17. The tubular body of claim 8, wherein the cap unit comprises a pair of protrusions positioned on the first face.

18. A wire fitting, comprising:
a tubular body comprising a first end and a second end, a first opening at the first end, a second opening at the second end, a passage between the first opening and the second opening defining an interior region of the tubular body, and first threads positioned on an exterior surface of the tubular body;

a compressible plug dimensioned for insertion into the first opening of the tubular body, and comprising a first side and a second side opposite the first side, wherein at least one bore runs from the first side to the second side of the compressible plug; and a cap unit comprising a hollow cylindrical body and a first face positioned at a first end of the hollow cylindrical body, wherein the hollow cylindrical body comprises threads on an interior region of the hollow cylindrical body configured to threadenly engage the first threads so that as the cap unit is threaded onto the first threads the cap unit urges the compressible plug towards the second end of the tubular body, and wherein the first face comprises an opening positioned so as to be substantially aligned with the at least one bore of the compressible plug and the passage of the tubular body when the cap unit is threaded onto the first threads of the tubular body;

wherein a first diameter of the passage at a first position is larger than a second diameter of the passage at a second position to provide a tapered section of the passage between the first position and the second position;

wherein the tapered section of the passage is configured to compress at least a portion of the compressible plug so that a cross-sectional area of the at least one bore is decreased as the cap unit is threaded onto the first threads of the tubular body; and wherein the compressible plug comprises at least one slot positioned on the first side and dimensioned for receipt of a protrusion of a ring washer, wherein the ring washer has an outer diameter substantially equal to a diameter of the compressible plug and the ring washer has an inner diameter smaller than the outer diameter.

* * * * *